United States Patent [19]

Kuga

[11] Patent Number: 5,438,453
[45] Date of Patent: Aug. 1, 1995

[54] LIGHT SOURCE FOR FLAT-PANEL DISPLAY

[75] Inventor: Kaeko Kuga, Kyoto, Japan
[73] Assignee: Rohm Co., Ltd., Kyoto, Japan
[21] Appl. No.: 84,124
[22] Filed: Jul. 1, 1993
[30] Foreign Application Priority Data Jul. 3, 1992 [JP] Japan .................. 4-176869

[51] Int. Cl.⁶ ............... G02B 27/14; G02B 5/04
[52] U.S. Cl. .................. 359/636; 357/618; 357/834; 357/850; 362/31; 362/342; 362/346; 362/800
[58] Field of Search ............ 359/636, 618, 834, 850; 362/31, 342, 346, 800

[56] References Cited

U.S. PATENT DOCUMENTS

| | | | |
|---|---|---|---|
| 2,267,948 | 12/1941 | Rahtsch | 359/636 |
| 4,113,353 | 9/1978 | Matsushita | 359/636 |
| 4,249,231 | 2/1981 | Decaux | 362/31 |
| 4,257,084 | 3/1981 | Reynolds | 362/800 |
| 5,005,974 | 4/1991 | Baum | 359/618 |
| 5,079,675 | 1/1992 | Nakayama | 362/31 |

Primary Examiner—Georgia Y. Epps
Assistant Examiner—Michael A. Papalas
Attorney, Agent, or Firm—Nikaido, Marmelstein, Murray & Oram

[57] ABSTRACT

A light source for flat-panel display comprising reflectors each having a triangular shape in section which are stacked on top of another so as to have at least three slant faces such that at least an uppermost face of the stacked reflectors is perpendicular to a lateral side thereof, a slant face of each of the reflectors being subjected to a surface treatment such that a ray of light incident laterally to the reflectors is reflected substantially parallel to a lateral side thereof, whereby rays of colors which are incident laterally to each of the reflectors advance via the uppermost face of the stacked reflectors substantially perpendicularly.

8 Claims, 7 Drawing Sheets

LIGHT SOURCE FOR FLAT-PANEL DISPLAY

FIELD OF THE INVENTION

The present invention relates to light sources for flat-panel display such as liquid crystal display devices. Particularly, it relates to a light source for flat-panel color display which uses three primary lights, red, green and blue, as light-emitting sources disposed on the back side of the panel, thereby to realize a color display.

BACKGROUND OF THE INVENTION

There are various types of flat-panel displays such as liquid crystal displays (LCDs) and electro-chemical displays (ECDs), any of which consumes a small electric power and the scope for applying the flat-panel display becomes wider. Liquid crystal displays, for example, are operable at a very low voltage with a very low electric power consumed. This is incomparable to other display devices. Therefore, liquid crystal displays are applied to a broad range of devices such as audiovisual apparatus, personal computers, television sets, games, and measuring instruments for cars. Now, they are strongly desired to realize a more colorful display.

As conventional liquid crystal color displays there have been a color filter type display, twisted nematic-type display, pleochroic type display or the like. The basic structure of the color filter type display, which is in practical use, is shown in FIG. 6.

Referring to FIG. 6, on both sides of a liquid crystal layer 11, glass substrates 19, 22 are disposed, and or one glass substrate 19, alignment coating 12 for forming an alignment of liquid crystal molecules so as to orient in the predetermined direction, a transparent electrode 14 forming an electrode for each segment, on which RGB ( red, green and blue) color filters 15, 16 and 17 are microscopically arranged in a matrix pattern so as to be coincident with display pixels. Representative ways of arranging the color filters include mosaic like arrangement, stripe arrangement, and triangular like arrangement. Usually, a black matrix is formed intermediate among the RGB color filters 15, 16 and 17 so as to provide the same color tone with the liquid crystal display surface when viewed from the front side. This contributes to improvements in contrast and color purity. On the other glass substrate 22, the alignment coating 13 and a transparent electrode 21 are disposed, and in the outer side of both glass substrates the polarizers 20, 23 are each arranged, further on the lower side of the polarizer a backlight 24 is disposed.

In this arrangement, liquid crystal molecules in the liquid crystal layer 11 are made to orient in a specific direction in response to the voltage applied to the transparent electrodes 14 and 21 provided respectively on opposite sides of the liquid crystal layer 11, whereby the liquid crystal layer 11 transmits light emitted from the backlight. The light passing through the liquid crystal layer 11 further passes through any one of the RGB (red, green and blue) color filters 15 to 17 depending on the subject pixel, then advances a red, green or blue ray. Depending on which pixel light passes through, a desired color is viewed because of a mixture of the color of the subject ray with the color of an adjacent ray, thereby achieving a color display.

The color filter described above comprises a light-shielding layer, colored layer of R, G or B, protective film, and common electrode. The colored layer is formed by dyeing, pigment dispersion, printing, electro-deposition, vapor deposition, or a like technique. Most of color filters in practical use employ dyeing or pigment dispersion. However, these techniques need photolithography and thereby make a large-size color filter expensive. For this reason, the prevalence of conventional flat-panel displays such as liquid crystal color displays is delayed. Therefore, an inexpensive flat-panel color display is being strongly desired. SUMMARY OF THE INVENTION It is, in view of such circumstances, an object of the present invention to provide a light source for flat-panel color display which does not need a color filter and is, hence, inexpensive.

SUMMARY OF THE INVENTION

According to the present invention, there is provided a light source for flat-panel display comprising reflectors each having a triangular shape in section which are stacked on top of another so as to have at least three slant faces such that at least an uppermost face of the stacked reflectors is perpendicular to a lateral side thereof, a slant face of each of the reflectors being subjected to a surface treatment such that a ray of light incident laterally to the reflectors is reflected substantially parallel to a lateral side thereof, whereby rays of colors which are incident laterally to each of the reflectors advance via the uppermost face of the stacked reflectors substantially perpendicularly.

"A ray of light incident laterally to the reflectors is reflected substantially parallel to a lateral side thereof" or "a ray advances via the uppermost face of the stacked reflectors substantially perpendicularly" in the specification means that a ray of light incident laterally to the reflector advances so as to pass through each of the pixels of the flat-panel such as a liquid crystal panel disposed over the upper side of the reflectors.

It is preferable that the rays which are incident a lateral side include red, green and blue rays.

It is preferable that the surface treatment subjected to the slant faces is to form a plurality of slits on the slant faces.

It is preferable that the reflectors being composed of three pieces, each of which has a right-angled triangle in section are stacked such that upper side surface is a horizontal plane and superposed parts have a parallel face to each other.

It is preferable that the reflectors are stacked such that a slant face of one of the reflectors having a right-angled triangle on section is opposed to a slant face of another one of the reflectors having an acute-angled triangle in section.

It is preferable that the reflectors are stacked such that one of the reflectors having an acute-angled triangle is interposed between another reflectors having a right-angled triangle and such that upper side surface of thus stacked reflectors is a horizontal plane and superposed parts thereof have a parallel face to each other.

It is desired that a translucent or perfectly-reflective film be formed on any face of the stacked reflectors.

Preferably, a light-emitting diode (LED) is used as a light-emitting source for the three primary colors because it offers a high response speed and is driven with ease.

In the present invention, the slant face of each reflector is treated so that a ray of light incident parallel to the base thereof is reflected perpendicular thereto, and the three reflectors are stacked on top of another so that three horizontal rays of light incident from different directions is mixed at substantially the same location. Hence, the use of the three primary colors for the rays of light incident makes it possible to emit light of a desired color. If such light is used as a light source and led to each pixel of a flat-panel display such as LCD or ECD from the reverse side of the panel, a color display is realized based on the combination of the light with the light-transmission of a liquid crystal layer or the like which is dependent on the voltage applied.

DETAILED DESCRIPTION

The present invention will now be described in detail with reference to the drawings.

Figure 1A:
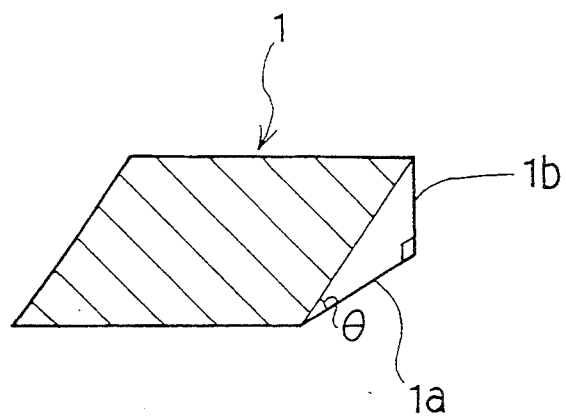
FIGS. 1a and 1b are explanatory views for illustrating the principle of a reflector as used in one embodiment of a light source for flat-panel display according to the present invention.
Figure 1B:
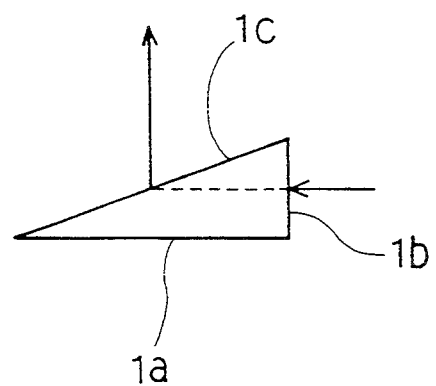

FIG. 1a is a perspective view showing a reflector 1 made of a plastic or the like, which is one of the basic elements of the present invention, and FIG. 1b is an explanatory sectional view of the reflector 1. The reflector 1 has a base 1a, lateral side 1b perpendicular to the base 1a, and slant face 1c. The angle $\theta$ of the slant face 1c with respect is to the base 1a is appropriately selected from the range of 0° to 45° with no particular limitation. However, is a small angle is preferable for the angle $\theta$ for the sake of efficient reflection and reduced space for a light source intended.

The slant face 1c of the reflector 1 is subjected to a surface treatment so as to upwardly reflect light incident from the lateral side 1b as shown in FIG. 1b. As one example of such a surface treatment, a slit 1d is formed so that a ray of light P incident parallel to the base 1a at the lateral side 1b reaches the inclined face of a rectangular prism 1f at 45° as shown in, for example, FIG. 2a. The provision of a plurality of slits as same as the slit 1d enables the ray of light not reflected by and passing through the first slit 1d to be reflected by the next one. Thus, the ray is totally reflected thereat and advances upward, thereby converging the light effectively.

Figure 2A:
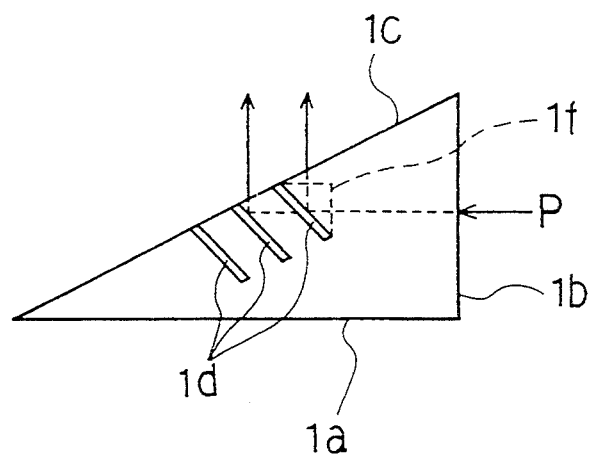
FIGS. 2a and 2b are explanatory views for illustrating examples of a treatment given to a slant face of a reflector at which light incident laterally is reflected vertically, according to one embodiment of the present invention.
Figure 2B:
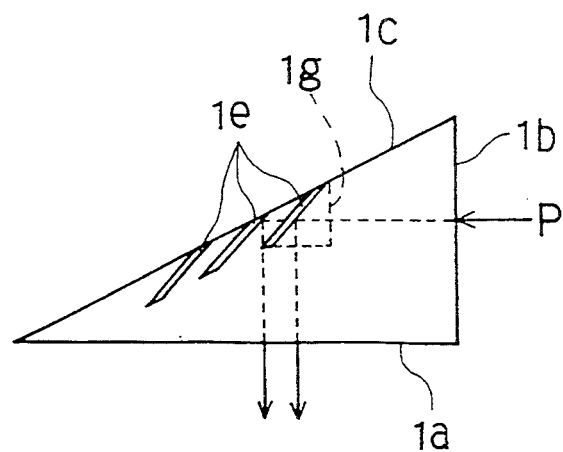

Alternatively, as shown in FIG. 2b, a slit 1e may be formed into the slant face at 45° with respect to the base 1a as opposed to the slit 1d shown in FIG. 2a. Ray of light P incident from the right-hand side is reflected downwardly at the inclined surface of a rectangular prism 1g. A portion of the ray P which passes through the slit 1e is reflected at a face of the next slit opposite to the slit 1e, returns to the inclined surface, and is reflected upwardly thereat. As in the case of FIG. 2a, there is another portion of the ray P which passes through the first slit 1e is totally reflected at the next slit and advances downward.

Besides forming slits on the slant face 1c at 45° with respect to the base 1a, a ray of light may be reflected upward perpendicularly to the base 1a by spraying or applying a dispersing agent such as transparent spray onto the slant face 1c or making the slant face 1c rough to scatter light. In this case, there is a significant amount of light reflected downward, in addition to light reflected upward. Further, in the case of the utilization of light-scattering, light is reflected in different directions hence, the amount of light to advances upward and to be led to a liquid crystal layer or the like is decreased, resulting in a decreased efficiency though serving the purpose. The treatment subjected to the slant face 1c of the reflector 1 for making light be reflected upward may be given only to the portion adjacent the reflection portion of the slant face 1c at which light incident is reflected or to the overall slant face 1c. Usually, the overall slant face 1c is subjected to such a treatment because the base of the reflector is matched in size with a pixel and the overall slant face 1c is utilized.

The reflector 1 may be formed of any material which transmits light with ease and can readily be treated for light reflection, for example, a glass plate as well as a plastic plate.

Figure 3A:
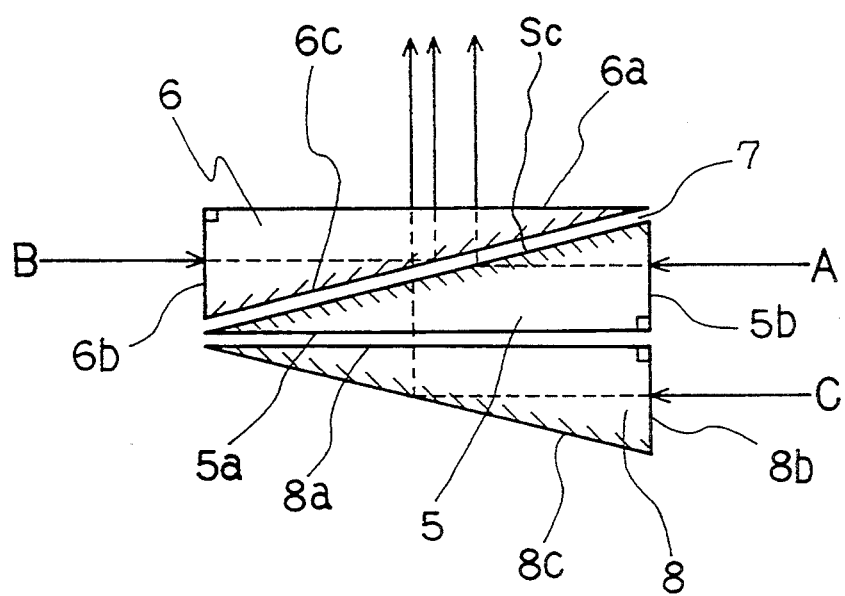
FIG. 3a is a schematic section showing one embodiment of a light source for flat-panel display according to the present invention.

To be described next is a color light source for flat-panel display according to the present invention which is formed by combining reflectors of the type described above. FIG. 3a is an explanatory sectional view illustrating one embodiment of a light source for flat-panel color display according to the present invention.

Referring to FIG. 3a, numeral 5 denotes a first reflector of which slant face 5c is subjected to a surface treatment so that light incident at a lateral side 5b thereof is reflected upward. Accordingly, a ray of light A emitted from a first light source and incident at the lateral side 5b on the right-hand side in FIG. 3a is reflected at the slant face 5c and advances upward as in the foregoing description. On the slant face 5c of the first reflector 5 is placed a second reflector 6 so that the slant face thereof having an inclination at the same angle with the slant face 5c would face opposite the slant face 5c either with a slight clearance 7 therebetween or in direct contact therewith. The reflector 6 is subjected to a surface treatment for light reflection at its slant face 6c in the same manner as described with reference to FIG. 2b. Accordingly, a ray of light B incident at a lateral side 6b of the reflector 6 is reflected toward the base 6a, or upward, by the slant face 6c. Note that the second reflector 6 is desirably identical with or similar to the reflector 5 in external shape. This is because if the second reflector 6 is shaped as such, the base 6a of the second reflector 6 becomes parallel to the base 5a of the first reflector 5, so that the upwardly reflected light advances straight vertically. On the lower side of the first reflector 5 is disposed a third reflector 8 so that the base thereof would face opposite the base 5a of the first reflector 5 either with a slight clearance 9 therebetween or in direct contact therewith. The slant face 8c of this third reflector 8 is also treated for light reflection in the same manner with the second reflector 6. Accordingly, a ray of light C incident parallel to the base 8a of the third reflector 8 at the lateral side 8b thereof is reflected toward the base 8a, or upward, in the same direction with the rays of light A and B.

If the rays of light A, B and C are emitted from red, green and blue light sources, respectively, the three primary colors are mixed together and, by controlling the intensity of each ray, a desired color can be obtained. A liquid crystal layer sandwiched between electrodes, for example, is disposed on the base 6a of the second reflector 6. Since the liquid crystal molecules rise or lie depending on the driving voltage across the liquid crystal layer, light is permitted to pass through the liquid crystal layer or blocked thereby. Therefore, by driving the aforementioned light-emitting sources when light is permitted to pass through the liquid crystal layer, a ray of light of a desired color passes therethrough. Hence, a flat-panel color display is realized.

Figure 3B:
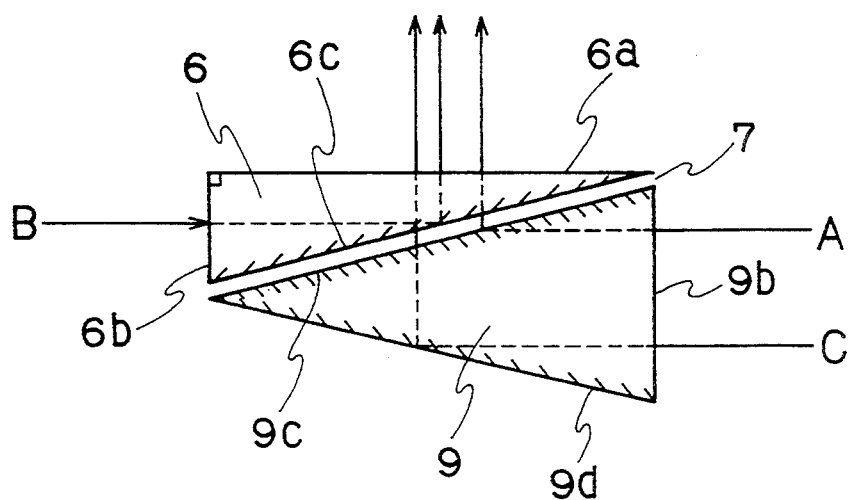
FIG. 3b is a schematic section showing another embodiment of a light source for flat-panel display according to the present invention.

With the third reflector 8 disposed so that the base 8a thereof would face opposite the base 5a of the reflector 5 as shown in FIG. 3a, light reflected at the slant face 8c advances vertically to the base 8a without refraction. The light then enters the first reflector 5 vertically from the base 5a thereof and is refracted at the slant face 5c. Although refracted, the light further enters the second reflector 6 and advances from the base 6a thereof which is parallel to the base 5a of the first reflector 5. As a result, the light advances upwardly vertically without refraction. Therefore, on condition that reflectors each having a right-angled triangular shape in section are disposed so that the bases thereof would face opposite each other, the lateral side 8b may lie on the left-hand side as opposed to FIG. 3a, or the three reflectors may be combined together so that three horizontal rays of light would be incident from three different directions, respectively, as shown in the exploded, perspective view of FIG. 4. With the latter arrangement, there is no need to dispose two light-emitting sources in a narrow space so as to make two rays enter two reflectors, thus facilitating construction. As shown in FIG. 3b, it is possible that the first reflector 5 and the third reflector 8 are integrally formed to obtain a reflector 9 having an acute-angled triangle shape in section so that thus obtained two slant faces 9c, 9d are used as a reflector surface and each ray of A and C can be incident parallel to the base 9c of the reflection 9 at the lateral side 9b.

Further, since light is not reflected toward the slant face 8c of the third reflector 8, the slant face 8c may be inclined at any desired angle different from the inclination angles of the slant faces 5a and 6c of the first and second reflectors 5 and 6. If the inclination angle of the slant face 8c of the third reflector 8 is small, the reflected light advances with little refraction. Hence, the third reflector 8 may be disposed on top of the second reflector 6.

Figure 5:
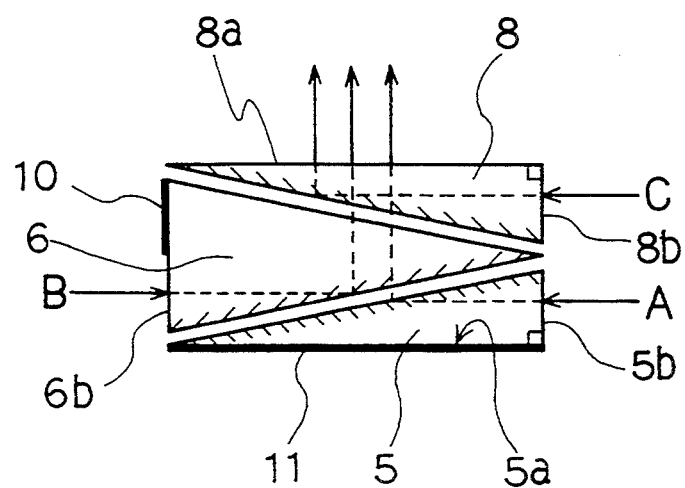
FIG. 5 is a schematic section showing still another embodiment of a light source for flat-panel display according to the present invention.
Figure 6:
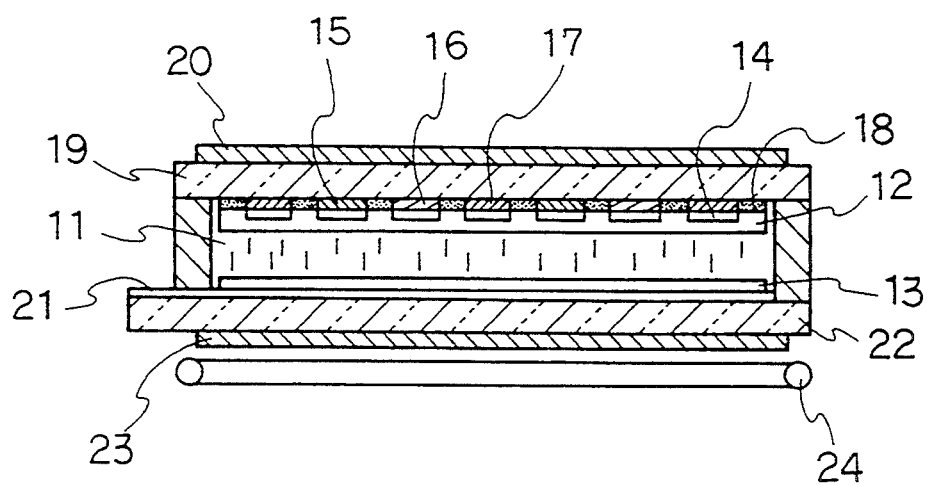
FIG. 6 is a schematic section showing a conventional liquid crystal color display device.

In the above embodiment, the first and second reflectors 5 and 6 are similar to each other in sectional shape and combined so that the respective bases 5a and 6a thereof would be parallel to each other. However, as far as the uppermost face (top face) of the combined reflectors is made substantially parallel to the flat-panel disposed thereon, a ray of light incident laterally to the reflector advances via the uppermost face of the stacked reflectors substantially perpendicularly and is effectively converged on the liquid crystal layer or the like. That is, "substantially parallel" or "substantially perpendicularly" means that the light incident to the reflector advances so as to be reflected and to be efficiently converged on the liquid crystal layer. Therefore, as shown in FIG. 5, first and third reflectors 5 and 8 may be disposed so as to sandwich a second reflector 6 having a triangular shape in section and having two slant faces which are inclined at the same angles with the slant faces of the first and third reflectors 5 and 8. In this case, preferably, the upper half of lateral side 6b of the second reflector 6 is coated with a light-reflective film 10 so as to make three rays equal in light quantity.

As the light-emitting source for use with the present invention, a semiconductor chip such as an LED might be disposed adjacent the combined reflectors to lead light emitted therefrom to the combined reflectors directly, or light emitted from an LED of large output might be branched by means of optical fibers and led to the light-incident faces of the combined reflectors. Further, besides an LED, there may be used a light-emitting source responsive to ON-OFF operation with high speed, such as an EL or plasma display.

Figure 4:
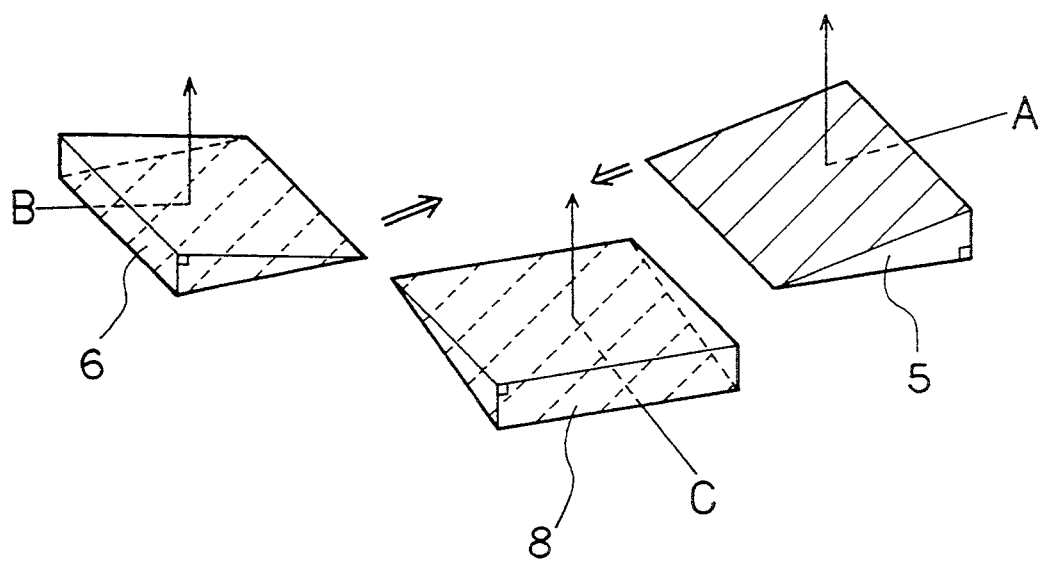
FIG. 4 is an exploded, schematic perspective view showing another embodiment of a light source for flat-panel display according to the present invention.

In the aforementioned embodiments of FIGS. 3 and 4, if the base 5a of the first reflector 5 is partially formed with a light-reflective film of a translucent film, the rays A and B incident at opposite lateral sides which may be partially reflected downward are further reflected upward by the base 5a, thus leading to effective utilization of light. Note that in this case since about a half of the ray C incident from the base side is reflected, the intensity of the ray C needs to be previously enhanced.

Alternatively, such a translucent film may be provided on the slant face 5c of the first reflector instead of on the base 5a of the first reflector 5. In this case the rays of light from the first and third light-emitting sources are weakened and, hence, the light intensities of such rays need to be previously enhanced. If the use of a translucent film is taken into consideration, there is no need to treat the second reflector so as to reflect light in the direction opposite to the reflection direction of the first reflector. Specifically, the reflectors may be combined as shown in FIG. 3a with use of the second reflector which is identical with the first reflector. Then, the ray B incident from the left-hand side is made to be reflected downward at the slant face 6c of the second reflector 6 and to be reflected again by means of a translucent film formed on, for example, the base 5a of the first reflector thereby converging the ray upward.

Further, in the embodiment of FIG. 5, the provision of a light-reflective film 11 on the base 5a of the first reflector 5 would make it possible to reflect all the downwardly reflected light upward effectively.

As has been decribed, according to the presention three reflectors each composed of a thin plate material and adapted to reflect light substantially perpendicularly are stacked on top of another, whereby rays of light from three different directions are converged in one direction. Thus, the use of three primary colours, for example, red, green and blue, as the light-emitting sources for the three rays can supply light of a desired color to each pixel of a flat-panel display composed of a multiplicity of small pixels, such as a liquid crystal display. With the present invention, in addition, all the rays from three directions can be made incident parallel to the plane of the flat-panel display, thus leading to a display of decreased size. Accordingly, when used with a liquid crystal panel, light of a desired color is made to pass through the panel or blocked thereby by controlling the voltage applied across the opposite sides thereof. Consequently, the present invention offers such an effect as to realize a flat-panel color display of a decreased size with ease if only combined with a monochromatic display panel.

Further, unlike a conventional liquid crystal color display, the present invention employs a color light sources such as LEDs without necessitating the use of an expensive color filter and a back light. Hence, a color display can be constructed with less cost.

Though several embodiments of the present invention are described above, it is to be understood that the present invention is not limited only to the abovementioned, various changes and modifications may be made in the invention without departing from the spirit and scope thereof.

What is claimed is:

1. A light source for flat-panel display comprising:
   reflectors each having a triangular shape in section which are stacked on top of another so as to have three slant faces such that at least an uppermost face of the stacked reflectors is perpendicular to a lateral side thereof,
   a slant face of each of the reflectors being subjected to a surface treatment such that a ray of light incident laterally to the reflectors is reflected substantially parallel to a lateral side thereof,
   wherein rays of three colors which are incident laterally to each of the reflectors advance via the uppermost face of the stacked reflectors substantially perpendicularly.

2. The light source of claim 1, wherein the rays which are incident a lateral side include red, green and blue rays.

3. The light source of claim 1, wherein the surface treatment subjected to the slant faces is to form a plurality of slits on the slant faces.

4. A light source of claim 1, wherein the reflectors being composed of three pieces, each of said reflectors is a right-angled triangle in section, the reflectors are stacked such that superposed parts have a parallel face to each other.

5. The light source of claim 1, wherein the reflectors are stacked such that a slant face of one of the reflectors, having a right-angled triangle on section, is opposed to a slant face of another one of the reflectors.

6. The light source of claim 1, wherein the reflectors are stacked such that one of the reflectors having an acute-angled triangle is interposed between another reflectors having a right-angled triangle and such that superposed parts thereof have a parallel face to each other.

7. The light source of claim 1, wherein any face of said stacked reflectors is formed with a light-reflective film.

8. The light source of claim 2, wherein said red, green and blue rays are each emitted from a light-emitting diode.

* * * * *